M. & S. PENNOCK.
Grain Drill.
No. 149.
Reissued Oct. 30, 1849.
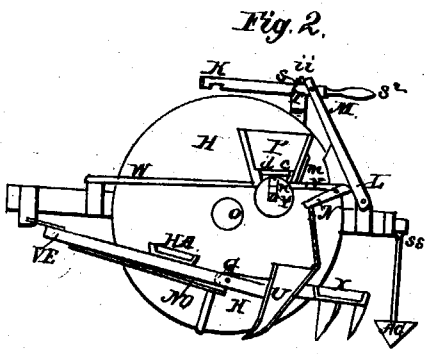
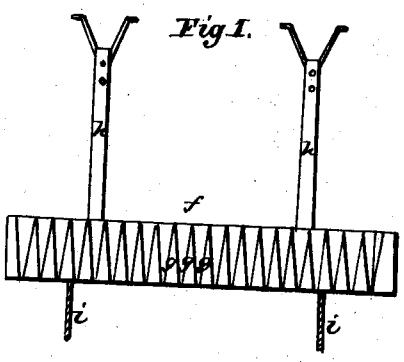
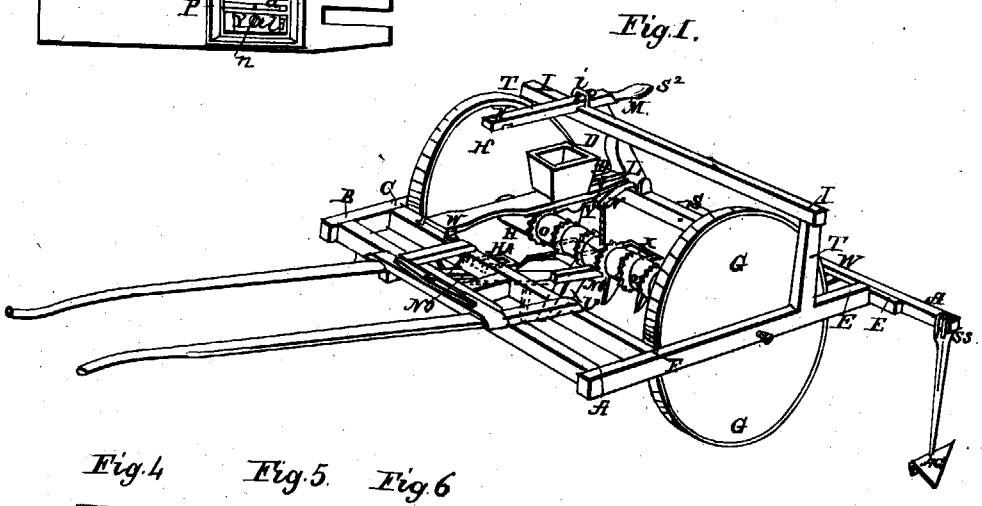
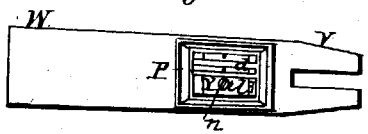
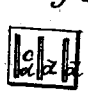
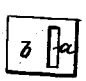
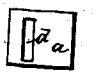
N. PETERS, PHOTO-LITHOGRAPHER, WASHINGTON, D. C.

UNITED STATES PATENT OFFICE.

MOSES PENNOCK AND SAML. PENNOCK, OF EAST MARLBOROUGH, PA.

IMPROVEMENT IN SEED-PLANTERS.

Specification forming part of Letters Patent No. 1,999, dated March 12, 1841; Reissue No. 149, dated October 30, 1849.

*To all whom it may concern:*

Be it known that we, MOSES PENNOCK and SAMUEL PENNOCK, of East Marlborough, in the county of Chester and State of Pennsylvania, have invented a new and useful Improvement in the Grain and Seed Drill called the "Lever-Drill;" and we hereby declare that the following is a full and exact description of the machine and the manner of using it, together with the part which we claim as our invention.

First. We construct a suitable frame of wood, A B C D E F.

Second. To the front beams, A B and C F, is attached a pair of shafts, or a tongue, so as to use the machine with one or two horses.

Third. On the extremities of the axle O, and inside of the frame, are placed the wheels G H. One of these wheels is fixed firmly on the axle, so that they must revolve together. Both wheels may be fixed on the axle.

Fourth. On this axle are fitted at intervals cast-iron spur-wheels of any required number of teeth.

Fifth. About ten inches, or at any required distance behind the axle of the machine, two upright posts, T T, are mortised into the beams A E and B D, to support a horizontal beam, I I, parallel to the axle. On the upper side of this beam are placed at intervals staples $i^2$, large enough to allow a square slide, $S^2$, to play in each of them freely. These staples may be made of cast-iron and secured to the beam I I in any convenient manner.

Sixth. Wooden slides $S^2$ K rest on the beam I I, and slide backward and forward in the staples described in the last article. The hinder end of each slider is formed into a handle. The slider plays lengthwise thirteen inches, having a notch on the under side, near its forward end, at K, which, when the slider is drawn back, falls on and fits to the beam I I. Just beyond this notch is a pin projecting from the under side of the slider, which prevents it from being drawn out of the staple. Another notch, at S, on the under side of the slider, when it is pushed forward, fits to the beam I I. These notches are cut to nearly half the depth of the slider.

Seventh. Immediately behind the notch S in the slider, and between the handles is a vertical mortise, through which passes loosely a tenon, formed on the upper end of a bent lever, L M. The lower end of this bent lever falls into a cast-iron box secured to the beam E D, having an iron pin passing horizontally through the said box and lever, forming a fulcrum on which the lever moves. By means of this fulcrum or joint at the angle of the said bent lever the slider may be readily moved back and forth, so that either notch shall fall on the beam I I while throwing the seeding roller and drill into or out of operation simultaneously.

Eighth. When the slider attached to the upper end of this bent lever is drawn back, so that the notch K falls on the beam I I, the forward end, N, of the bent lever will be elevated; but when the handle of the slider is pushed forward, so that the notch S falls on the beam I I, this extremity of the lever will be depressed.

Ninth. A hinged frame, V W, to support the hopper, is fitted at one end by a hinge to the beam F C, and extends horizontally over the axle. The end V rests on the short arm of the bent lever, and rises or falls as the latter is elevated or depressed.

Tenth. The hopper P, for containing the seed, is made in the form of a frustum of a pyramid. A cast-iron grate forms the bottom of the hopper. The opening in the hopper-bottom is divided by small bars in the iron grate into several apertures. To adapt these apertures to the various kinds of seed or grain to be sown, a number of wooden bottoms, *a b c*, are formed to fit into the hopper and rest on the grate. In each of these one or more apertures, *d*, are formed, corresponding exactly with an equal number of those in the grate. Thus for wheat or rye a bottom must be used having an aperture corresponding with one of the larger ones in the grate, and for Indian corn a bottom must be employed with an aperture corresponding to the other; but for clover-seed a bottom must be employed with small apertures corresponding to the small ones in the grate.

Eleventh. Directly under the hopper is a roller, Y, whose axis is parallel to that of the principal axle. This roller turns on an iron axis, which passes through it, and works at each end in a box secured to the under side of the frame on which the hopper rests. To one end of the roller is fixed a cast-iron spur-wheel, concentric with the roller, and turning with it on the same axis. The circumference of this spur-wheel and the number of teeth correspond exactly with those of one of the spur-wheels described in the fourth article. When the machine is in operation the teeth of the spur-wheel on the roller work on those of the axle. They of course revolve simultaneously.

Twelfth. A number of holes, cells, or cavities are formed in the roller to a small depth, at regular intervals, to receive from the hopper, through the apertures in its bottom, the seed or grain to be scattered. These holes, in regard to number and size, are calculated to receive the quantity of seed designed to be dropped at one revolution of the wheels. Thus, in that part of the roller which revolves under one of the larger apertures in the hopper's bottom we generally have ten holes, each capable of receiving a grain of Indian corn, so situated as to divide the circumference of the roller into ten equal parts. The grain will be dropped a little over eleven inches apart. In like manner, for any other kind of grain, the contents of one line of holes in the circumference of the roller must be equal to the quantity designed to be discharged through the corresponding aperture in the hopper's bottom during one revolution of the wheels. The roller runs close to the grated bottom of the hopper, which is rendered concave to fit the convexity of the roller. There is of course no way for the seed to escape from the hopper but by falling into these holes. If the frame of the grated bottom at the extremity of all the apertures were made to fit close upon the roller, it might frequently happen that a grain of the larger kind—as Indian corn, beans, or even wheat—having fallen partly into a hole in the roller and remaining partly above it, would be caught against the side of the grate and cut into parts. To prevent this destruction of seed, an indentation is made on the under side of this grate, opposite the hinder extremity of each larger aperture, of the size to admit the passing of a grain. This indentation is filled up by a small wooden bolt, furnished with a shoulder resting against the grate, so as to prevent the bolt from being pushed forward upon the roller. A spring fixed on the outside of the hopper presses against the outer end of the bolt and keeps it in its place. When a grain partly in the hole in the roller, but standing above its surface, is brought into contact with the end of this bolt, it pushes it back against the spring, which, yielding to the pressure, either permits the grain to pass through and drop with the others or by a rebound throws it back into the hopper.

Thirteenth. Immediately under the roller is the drill U, the mouth of which is large enough to catch all the seeds that fall from any part of the roller. The drill is composed chiefly of cast-iron. The front curves a little toward the point, which projects forward like the colter of a plow. The opening at the lower extremity is about one and a half inch long by one inch wide, of any suitable size. The front plate of the drill, as well as the lower half of the side ones, from the point upward, is composed of cast-iron or other suitable material. Across the top, on the hinder side of the drill, is extended an iron rod or bail, having a loop or eye in the middle, to which a rope or chain is attached to support the drill. The drill is cast with a socket projecting from its front plate. Into this socket the loose end of a hinged or jointed beam, G O V E, is firmly fitted, with its end pressing against the drill. On the under side of this beam there is a strong iron strap, N O, two inches wide and two feet long. This strap at the forward end, V E, or that farthest from the drill, is fastened to the beam by iron bolts passing through them. At the hinder end, N O, the strap is a small distance from the beam, and has secured on its upper side a wedge of wood of the same width as the strap. Through the strap thus compounded of wood and iron, near the end N O, passes a harrow-tooth. The upper half of this tooth is reduced to a cylinder having a shoulder on the back part of the tooth, which presses against the under side of the iron strap. On this cylindrical part a screw is cut, which, after passing through the iron strap and contiguous wedge, is screwed into the beam G O V E. By this screw the depth which the tooth runs into the ground may be varied. On this screw, between the wedge and the lever, a nut is fixed, to screw down hard on the wedge and prevent the strap from sliding up and down on the tooth. This is fixed to run about two inches before the point of the drill, and to penetrate a little deeper into the ground. It thus catches and carries with it those portions of the weeds and grass which would otherwise collect on the drill itself and obstruct the discharge of the seed. Fixed to the forward end of this hinged beam V E by the bolts above mentioned, which pass through the lever and iron strap, is a forked hinge eight inches long, spreading at the forward extremity nearly nine inches. This hinge works at the extremity of its branches in a pair of iron strap-hooks, which are screwed by screw-nails to the front of the beam A B. A narrow strip is fixed by screw-nails to the front of the beam A B, running lengthwise with it just above the hooks, to prevent the hinges slipping out of them. On the hinged beam, and between the hinge and the drill, is an open box, H A, for holding the weight when necessary to sink the drill more deeply into the ground. The rope or chain attached to the loop in the bail of the drill passes into an open mortise in the end N of the short arm of the bent lever described in article eight, and has a loop or ring thrown over a pin in the same. This rope or chain is prevented from slipping out of the open mortise by a scew-nail passing horizontally through the lever a short distance beyond the rope.

Fourteenth. As there are several spur-wheels on the axle of the machine, there are to be the same number of rollers and drills of the kind described above. The distance from the middle of one wheel to that of the other is about six feet, and the drills are so located as to divide this space into equal sections. Consequently when all the drills are used the seed is deposited in rows at equal distances apart; but these drills and the hinged beams that sustain them are connected with the frame in such manner that any one or more of them can be taken off and the others left for use.

Fifteenth. To each of the two outside drills is attached (in a manner to be taken off or put on at pleasure) a box, X, by side straps of iron, so as to allow a vertical motion, but keeping the box directly behind the drill. This box is composed of boards or other material, and is open at top, so as to contain a small weight. On the under side of this box are fixed two shovel-formed teeth, so located as to cast a ridge of earth on the line traced by the point of the drill.

Sixteenth. When the sliders described in the sixth article are pushed forward, so that the notch S nearest the handle falls on the beams I I, the arm L N of the lever assumes its proper position. The drill is then at liberty to sink into the ground. The stud of the frame V W, which supports the hopper, rests in the angle of the lever, and the teeth on the spur-wheel on the roller fall into gear with those of the principal axle. Consequently the revolution of the axle, caused by the progressive movement of the machine, must under these circumstances cause the roller to revolve; but when the slider is drawn back until the other notch, K, falls on the beam I I, the forward end, N, of the lever is elevated, the drill is raised out of the ground, and the teeth of the roller are lifted clear of those on the axle. When all of the sliders are thus situated the machine is totally out of gear. From the manner in which the sliders are situated it is clear that any one or more of the drills and seeding-rollers may be thrown out of gear simultaneously without affecting the others. This is a great convenience in case of sowing point-lands.

Seventeenth. In the middle of the beam E D a hole is bored horizontally, to receive a bolt, on which is made to revolve vertically an arm, S E. This arm, when in a horizontal position, rests in a hook. This hook serves to retain the arm in its place while in use, when the arm is placed in a vertical position, as it must be when turning the machinery. To this arm is fitted a sliding arm, W A, which slides along the arm S E in two strong iron clasps. This sliding arm may be drawn out to various distances, so as to compose with the hinged arm a compound arm of various lengths. Two portions of the slider, near its outer end, are cut into a cylindrical form, each of these cylindrical portions being about two inches long. Round these cylindrical portions of the slider are bent two iron straps, the ends of which are riveted to the flattened end of a tracer, S S. These bent straps thus form eyes, by means of which the tracer is kept at right angles to the sliding arm and permitted to revolve upon it in that position. The lower end of the tracer carries an instrument called the "marker," A G. The marker is firmly fixed on the end of the tracer in such manner that when the arm S E is brought to its horizontal position the marker will be on the ground with its ridge pointing forward. When the machine is set in motion, this marker, acting in the manner of a shovel-plow, will trace on the mellow ground a shallow furrow, along which the horse may walk on his return. By properly adjusting the length of the arm, composed of the branches S E and W A, the machine may be drawn backward and forward across the field in parallel lines at such distances as the nature of the case may require.

The manner of using the machine may be briefly given as follows: In the first place, the ground must be well plowed and harrowed, so as to be reduced to a smooth and mellow condition. For wheat, rye, oats, or other grain all the drills are adjusted to their places and the machine put in gear as described in the sixteenth article. The wooden bottom, with an aperture over the line of holes in the roller designed for wheat, must be put into each hopper and the proper supply of seed put in. The machine being then put in motion, the roller is turned by the spur-wheel on the axle. The seed discharged from the holes in the roller falls into the open drill below, and, descending to the point below, is deposited in the earth as the point plows its way through the mellow soil. The earth falling back into the furrow of the drill covers all the seed which are deposited in the bottom. Several parallel rows are thus lodged into the earth by each passage of the machine. The sliding arm described in the seventeenth article must be so far drawn out that the horse, or one of the horses, returning along the track made by the marker may cause one wheel of the machine to follow the line traced by the outer drill. In this manner a uniform distance will be obtained between the contiguous rows. Upon coming to the end of the land or intended rows the lever S E, which carries the marker, must be raised to a vertical position, the sliders $S^2$ drawn back to throw the machine out of gear, and all the parts left in that situation till the machine is brought to its proper place for commencing its return. The handles of the sliders are then pushed forward and the marker brought again to rest on the ground. In case of point-lands the proper number of drills may be kept in use and the rest thrown our of gear.

For Indian corn the drills next the wheels are retained and the other five taken off. In this case the shafts and a single horse will be most convenient. The proper wooden bottom and the requisite quantity of seed-corn being put into each of the outside hoppers, the arm A W must be drawn out to the required distance. To these drills may now be attached the boxes X, described in the fifteenth article, with the needful weight in each. A straight line being then traced across the field, two rows about four feet six inches apart are planted, and a ridge of earth thrown on each of them by the teeth in the box, or other suitable means. At the same time a path is formed by the marker for the horse to follow on his return, so as to make the following row four feet six inches from the former. The number of grains dropped at each revolution of the wheels will correspond to the number of holes made in the circumference of the roller.

For beets or rutabaga the middle or two outside drills may be used; but in that case the screws *n* in the bottom of the seed-holes for wheat, as represented in the drawings, Figs. 2 and 3, are to be screwed out even with the surface of the roller, in the end of which a hole is drilled sufficiently large to carry out one beet-seed at least. The arm of the marker must now be made six feet nine inches in length. The rows in this case will be twenty-seven inches apart.

For clover-seed all the drills are taken off, but the hoppers are all supplied with seed, and the second bottom in each has three apertures corresponding to the three in the grate. The holes in the rollers are calculated to distribute five quarts on an acre. To scatter the seed regularly over the ground, a board, *f*, may be suspended under the rollers in an oblique position. This board is furnished with narrow strips *g*, nailed across it, so as to scatter the seeds as they fall from the rollers regularly along its whole length. The suspension of the board is effected by attaching to it at right angles, sixteen or seventeen inches from its ends, two slender arms, the extremities of which work on the arm A B, in the place of the drill-beams described in the thirteenth article, and the rope *i*, fixed to the board near its ends, is attached to the contiguous short arms of the bent lever. This board, however, we seldom have occasion to use.

We wish it to be understood that we do not claim the separate or individual action of the seed-tubes independently of the seed rollers and hoppers; but What we do claim as our invention, and desire to secure by Letters Patent, is—

1. The simultaneous throwing into and out of operation, by the movement of a lever or other mechanical equivalent or device, each seeding-cylinder and its respective drill or seed-tube for the purpose of sowing with any number of hoppers and drills that may be required in sowing point or other irregular-shaped land without stopping the animal or animals attached to the machine, not intending to limit ourselves to the particular construction herein described, and represented in the annexed drawings, but to vary these in any way that we may deem proper, so that the before-described results are effected by means substantially the same as those described in the foregoing specification.

2. The arrangement of the spur-wheels for the purpose of connecting the seed-rollers Y and hoppers P to the shaft O, as before described, in such manner that they can be disengaged or engaged at pleasure while the machine is in motion.

In testimony whereof we have hereunto signed our names before two subscribing witnesses.

MOSES PENNOCK.
SAMUEL PENNOCK.

Witnesses:
JOSHUA TAYLOR,
WM. CHAMBERS.